United States Patent [19]

Thompson, Jr.

[11] 3,715,872
[45] Feb. 13, 1973

[54] MOWING APPARATUS
[76] Inventor: Philip Thompson, Jr., 16 Sunset Trail, Austin, Tex. 78745
[22] Filed: July 19, 1971
[21] Appl. No.: 163,598

[52] U.S. Cl. .................56/10.4, 56/11.9, 56/15.3, 56/16.7, 56/16.9, 56/320.2
[51] Int. Cl. .............................................A01d 35/26
[58] Field of Search........56/6, 10.4, 11.9, 13.6, 15.3, 56/15.5, 16.7, 16.9, 17.4, 320.1, 320.2

[56] References Cited

UNITED STATES PATENTS

| | | | |
|---|---|---|---|
| 3,261,150 | 7/1966 | Fitzgerald, Sr. | 56/10.4 |
| 3,599,403 | 8/1971 | Gantz | 56/10.4 |
| 3,115,739 | 12/1963 | Thoen et al. | 56/10.4 UX |
| 3,397,521 | 8/1968 | Danuser | 56/10.4 X |
| 3,183,651 | 5/1965 | Hoefler | 56/10.4 |
| 2,673,366 | 3/1954 | Johnson | 56/10.4 UX |

*Primary Examiner*—Louis G. Mancene
*Assistant Examiner*—J. A. Oliff
*Attorney*—Ralph W. Kalish

[57] ABSTRACT

A mowing apparatus adapted for mounted disposition upon a vehicle comprising a mounting arm, and first and second cutter blade-carrying arms presented in generally side-by-side relationship with resilient means for urging said arms toward each other; there being blade guards carried on said first and second arms. Said resilient means are yieldable upon impact of said guards with an upright so as to maintain said guards in contact with the upright while moving relatively therepast to present said blades for trimming grass and the like adjacent to said upright.

8 Claims, 17 Drawing Figures

FIG. I

INVENTOR
PHILIP THOMPSON, JR.

BY  *Ralph N. Kalish*

ATTORNEY

INVENTOR
PHILIP THOMPSON, JR.

BY Ralph N. Kalish

ATTORNEY

INVENTOR
PHILIP THOMPSON, JR.

BY *Ralph N. Kalish*

ATTORNEY

INVENTOR
PHILIP THOMPSON, JR.
BY
ATTORNEY

FIG. 10

INVENTOR
PHILIP THOMPSON, JR.

BY

ATTORNEY

INVENTOR
PHILIP THOMPSON, JR.

INVENTOR
PHILIP THOMPSON, JR.

BY Ralph N. Kalish

ATTORNEY

INVENTOR
PHILIP THOMPSON, JR.

BY  *Ralph N. Kalish*

ATTORNEY

MOWING APPARATUS

BACKGROUND AND SUMMARY OF THE INVENTION

This invention relates in general to mowing equipment and, more particularly, to a mower which is suited for mowing or trimming around posts, trees, poles, and the like.

It is a primary object of the present invention to provide mowing apparatus which is particularly adapted for efficient mowing of grass and weeds about uprights, such as posts, trees, and the like, as well as under guard rails along the side of roads, thereby obviating the resort to manual effort for close trimming action.

It is another object of the present invention to provide a mowing apparatus of the type stated which is readily adaptable for mounting upon various types of vehicles whether they be motor driven or pushed by hand.

It is a further object of the present invention to provide a mowing apparatus of the type stated which may be most economically constructed, having marked simplicity of components fabricated of durable materials so as to render the apparatus extremely reliable and resistant to breakdown in usage.

It is another object of the present invention to provide a mowing apparatus of the type stated having cooperating cutters so mounted as to effectively cut grass and the like immediately adjacent a post or tree, which components are so conceived as to function in an automatic manner.

It is another object of the present invention to provide a mowing apparatus of the type stated wherein the cooperating cutting elements may be controlled with respect to each other through various, optionally selectable means.

It is a still further object of the present invention to provide a mowing apparatus of the type stated which is amenable to volume in production; the operation of which does not require developed skill on the part of the user; the use of which conduces to substantial economies and labor such as of the type currently being utilized in conjunction with maintenance of areas bordering highways, parks, golf courses, and the like.

DESCRIPTION OF THE PRACTICAL EMBODIMENTS

Figure 1:
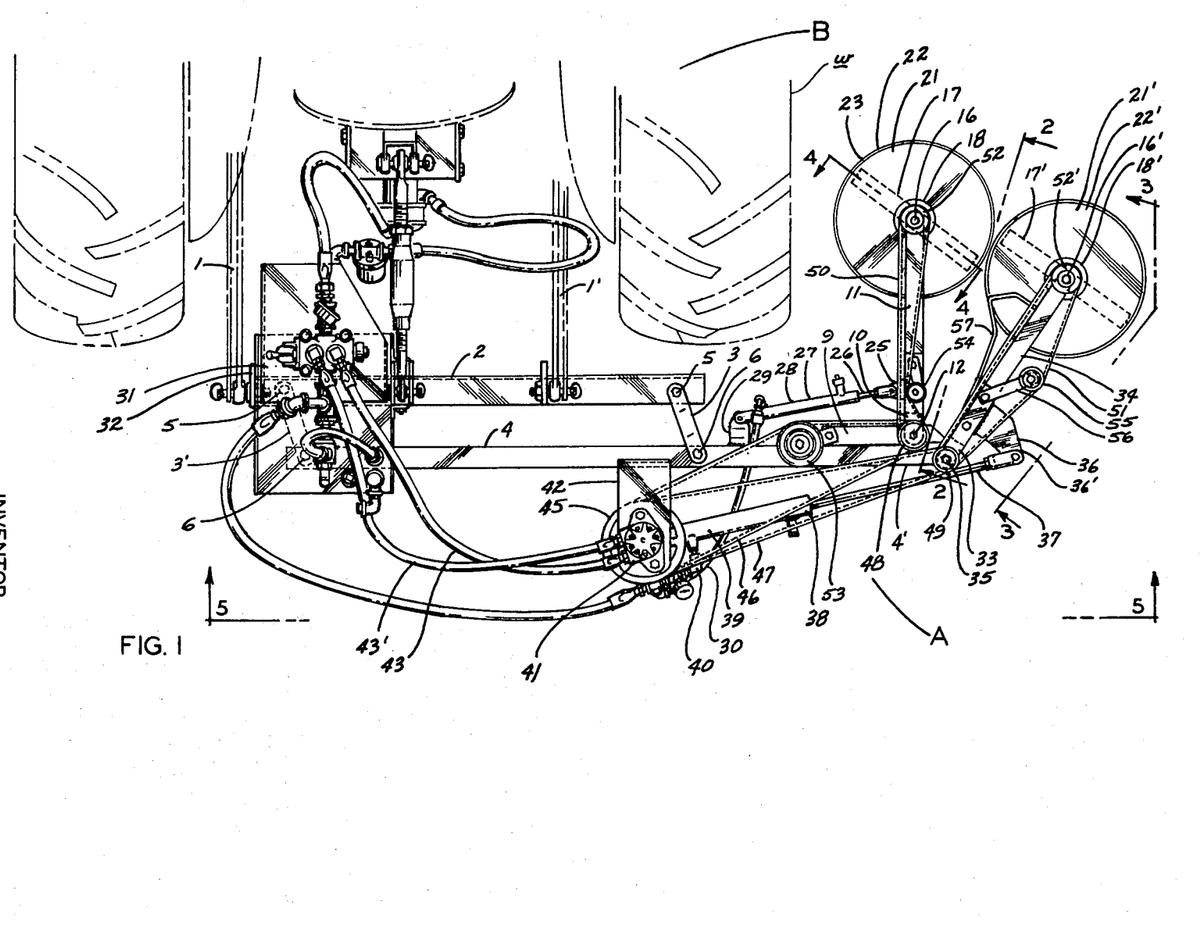
FIG. 1 is a plan view of a mowing apparatus constructed in accordance with and embodying the present invention illustrating the same as supported upon a farm tractor.
Figure 2:
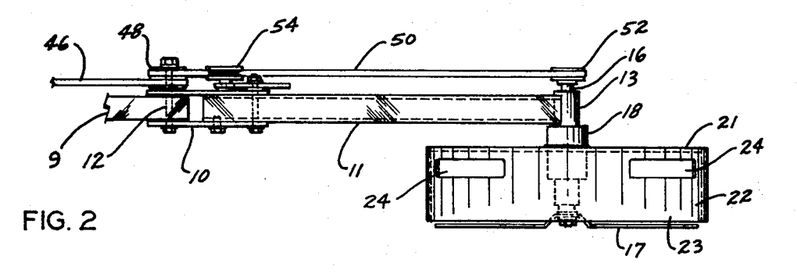
FIG. 2 is an elevational view taken on the line 2—2 of FIG. 1.

Referring now by reference characters to the drawings which illustrate practical embodiments of the present invention, A generally designates a mowing apparatus as supported upon a conventional motor vehicle such as a farm tractor B. Mower A is suitably suspended from the body of tractor B, for example, as by support arms 1,1' which extended rearwardly of tractor B and are adapted for vertical reciprocal movement; said arms 1,1' at their lower rearward ends being engaged to a beam 2 constructed preferably of general channel stock and with its longitudinal axis normal to the major axis of tractor B. Said beam 2, serving as a boom, is connected adjacent its ends by swing arms 3,3' to an elongated mounting arm 4 which is preferably of tubular stock having a box cross section and being of relatively greater length than said beam 2 so as to project at one end, as at 4', beyond the proximate end of beam 2 and laterally outwardly of the adjacent rearward wheel w of said tractor B. By reason of the mounting of swing arms 3,3' as by bolts 5,6 the same are adapted for rocking to allow of axial shiftable movement of mounting arm 4 for purposes presently appearing. However, said mounting arm 4 is urged into maximum laterally extended condition (as shown in FIG. 1) through the bias of an extension coil spring 7 secured at one end to the proximate flange of beam 2 and at its other end to a link 8 rockably secured to the lower ends of bolts 5,6 which engage swing arm 3'; said latter being located upwardly of link 8. Mounting arm 4, on its forward face proximate the extremity of its projecting portion carries an extension 9 which is received within the bifurcated end, as at 10, of an inner arm 11 for hinge formation; there being a hinge pin 12 which progresses through aligned openings in the said bifurcations and in extension 9 whereby inner arm 11 is swingable within a horizontal plane about the axis of hinge pin 12 for movement toward and away from tractor B. At its end remote from said hinge pin 12 inner arm 11 is rigid with a vertically presented hub 13 which incorporates bearing assemblies 14,15 for accommodating a driven shaft 16 which projects below bearing 15 and carries on its lower end a rotary cutter blade 17 for rotation with said shaft 16. Suitably mounted upon hub 13 beneath arm 11 and upwardly of bearing assembly 15 is a collar 18 having bearing assemblies 19, 20 for rendering same freely rotatable about hub 13; said collar 18 being fixed as by welding to the top circular plate 21 of a cylindrical blade guard 22 which incorporates a skirt 23 depending from plate 21 and terminating immediately upwardly of cutter blade 17 to prevent interference with the effective operation of the latter but provide adequate protection. Provided within skirt 23 spacedly thereabout is a plurality of enlarged apertures 24 for discharge therethrough of grass or the like severed by cutter 17.

Inner arm 11 will normally project in a direction parallel to the direction of travel of vehicle B, that is, axially parallel with the longitudinal axis of tractor B as shown in FIG. 1. On the side of arm 11 confronting vehicle B and proximate the connection to hinge pin 12 is a bracket 25 to which is engaged one end of a piston 26 of a fluid, although preferably hydraulic, assembly 27 comprising a cylinder 28 within which said piston 26 is axially reciprocally slidable. Cylinder 28 is pivotally mounted at its piston-remote end to a bracket 29 extending forwardly from the adjacent forward face of mounting arm 4, and is suitably connected by a flexible conduit 30 to a fluid pump and reservoir unit, indicated generally 31, being supported upon a frame structure 32 presented upwardly of beam 2 and carried upon vehicle B. Thus, upon the application of fluid to cylinder 28 piston 26 will be urged into extended condition for biasing inner arm 11 in outwardly swung condition that is, away from vehicle B.

Figure 3:
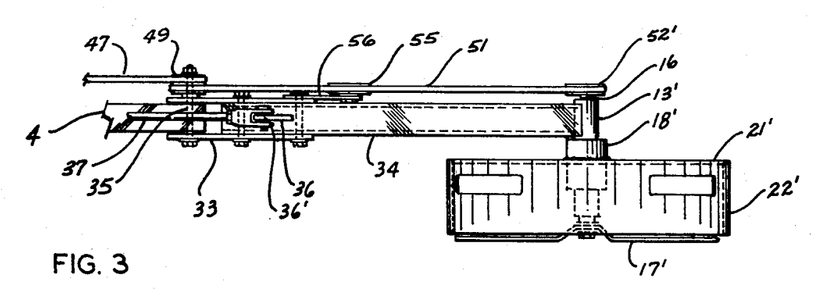
FIG. 3 is an elevational view taken on the line 3—3 of FIG. 1.
Figure 4:
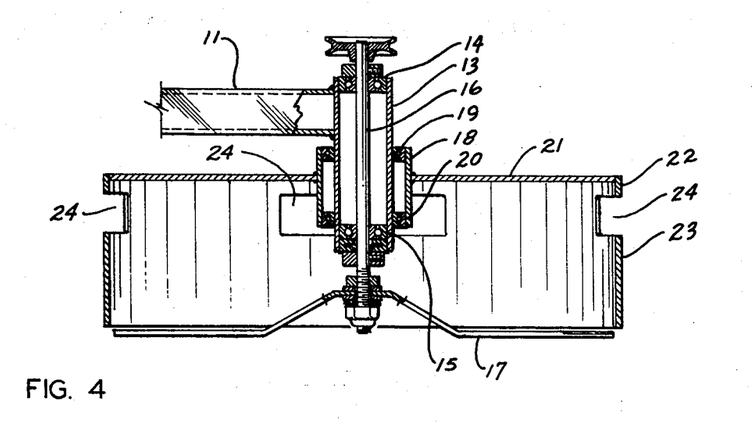
FIG. 4 is a vertical transverse sectional view taken on the line 4—4 of FIG. 1.
Figures 5, 6:
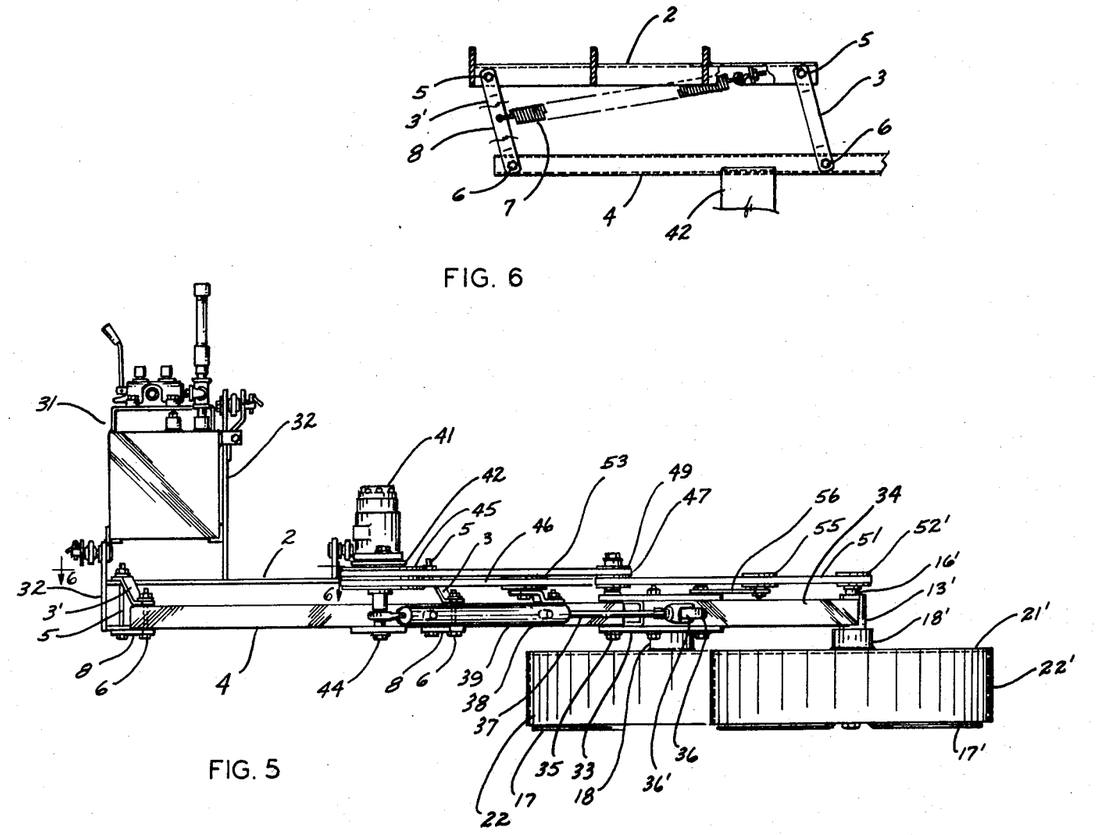
FIG. 5 is an elevational view taken on the line 5—5 of FIG. 1.
FIG. 6 is a plan view taken on the line 6—6 of FIG. 5.

Mounting arm 4 at its projected extremity is received within the bifurcated end, as at 33, of an outer arm 34 for developing a hinge joint therewith by means of a hinge pin 35 extending through registering openings in the bifurcations of arm 34 and mounting arm 4 (FIG. 3), thus outer arm 34 is swingable within a horizontal plane by means of the vertical axial rotation developed by hinge pin 35. Said inner arm 11 and outer arm 34 are co-planar with hinge pin 35 being located slightly rearwardly and laterally of hinge pin 12 so that, perforce, arm 34 will be fundamentally slightly to the rear and laterally outwardly of inner arm 11. At its forward, or hinge pin remote end, arm 34 carries a hub 13' having bearing assemblies (not shown) for accommodating a driven shaft 16' which on its lower end mounts a cutter blade 17'; there being a collar 18' rotatable about hub 13' and fixed to a cylindrical blade guard 22'. All of said last mentioned components being of the same character and for the same purpose as the corresponding components above described with respect to inner arm 11. On its laterally outward face, arm 34, proximate hinge pin 35 is a rigidly affixed bracket 36 with a rearward tapered end extremity 36' to which is pivotally engaged the normally outer end of a piston 37 of a fluid, preferably hydraulic, assembly 38 including a cylinder 39 which latter is suitably connected, as by a flexible conduit 40, to fluid reservoir unit 31. Said fluid assembly 38 is of relatively greater capacity than fluid assembly 27 with piston 37 being of relatively greater length and diameter, and capable of a greater stroke. Therefore, a predetermined differential is effected so that the bias of outer arm 34 in a direction toward vehicle B under influence of fluid assembly 38 is substantially greater than the bias of outer arm 11 outwardly, away from vehicle B. The fluid assemblies 38,27 thus coact to urge arms 34 and 11 together with their supported cutters 17', 17 and guards 22',22 toward each other; whereby guards 22,22' will normally be in substantial line contact on their confronting skirt portions.

It will be further seen that by reason of the disposition of arm 34 with respect to arm 11 guard 22' will be slightly to the rear of guard 22 and outwardly thereof.

Driven shafts 16,16' may be rotated by suitable means for causing cutter blades 17,17' to rotate for mowing purposes. However, in the present form of the invention such shafts 16,16' are operated from a fluid motor 41 carried upon a bracket 42 fixed to, and extending rearwardly from, mounting arm 4 in its central portion. Said motor 41 is appropriately connected by flexible conduits 43,43' to reservoir unit 31 and is provided with a main shaft 44 carrying a double groove sheave 45 for engaging the inner end portions of flexible transmission belts 46,47; the outer end of the former being trained about a pulley 48 carried on the upper end of hinge pin 12 and the latter in its outer portion being trained about a pulley 49 mounted upon the upper end of hinge pin 35 for rotation therewith. Each of said pulleys 48,49 also engage an endless belt 50,51, respectively, for engaging pulleys 52,52' mounted on the upper end of shafts 16,16', respectively. To assure of effective motion transmission for motor 41 to driven shaft 16, a tensioning device 53 is fixed on mounting arm 4 for engaging belt 46 while a takeup wheel 54 is disposed upon mounting arm 11 immediately proximate pulley 48. A tensioning wheel 55 for engaging belt 51 is carried on the end of an arm 56 swingably mounted at its inner end upon the upper surface of outer arm 34. Accordingly, upon operation of motor 41 driven shafts 16,16' will be caused to rotate for operating blades 17,17'. Fixed on the inner face of arm 34, beneath belt 51 is a guide rail 57, the forward portion of which overlies an edge of top plate 21' and the rearward portion of which inclines inwardly toward the plane of the side face of arm 34.

Figure 7:
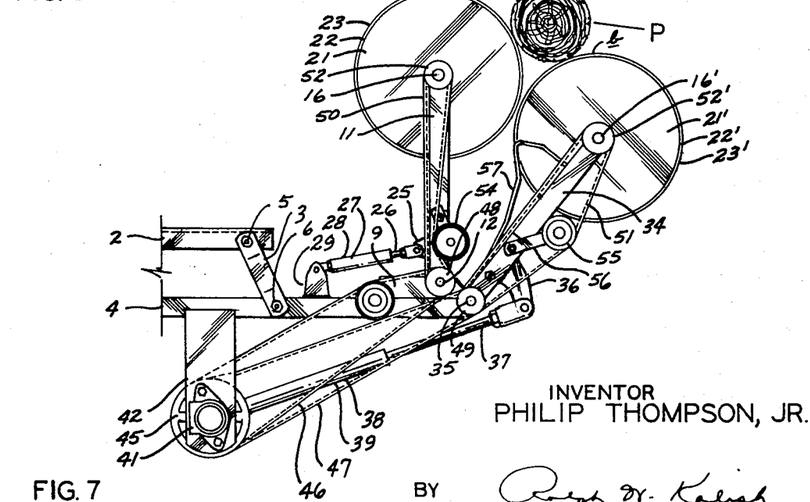
FIGS. 7, 8, and 9 are plan views illustrating successive relative positions of the mowing apparatus during trimming action.
Figure 8:
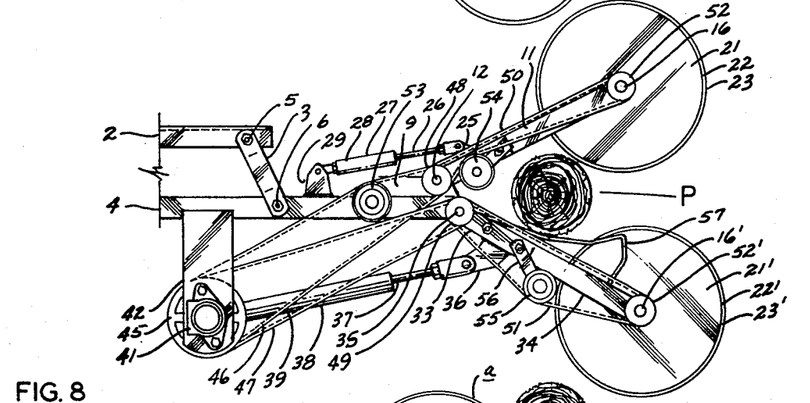
Figure 9:
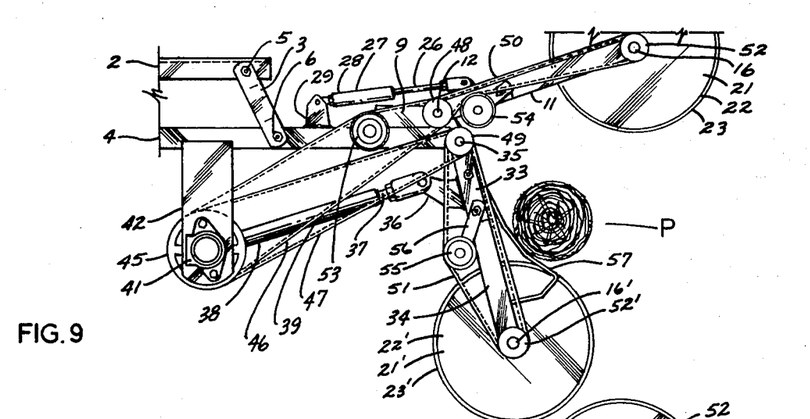

The operation of mowing apparatus A may be more readily understood by reference to FIGS. 7, 8, and 9, which illustrate the relative disposition of arms 11, 34 during the trimming of grass or the like immediately about an upright such as a tree, post, and the like, indicated generally at P. The operator of vehicle B will so direct the latter as to cause the particular upright P which is to be trimmed, to be contacted by guard 22 in its forward outer quadrant as at $a$ so that the associated cutter blade 17 is presented for trimming the related area about said upright P. As vehicle B moves forwardly upright P will be caused to strike guard 22' in its forward inner quadrant as at $b$ and will by such operation effect a relatively rearwardly directed force against guard 22' which will cause arm 34 to be rearwardly swung about its hinge pin 35 but by reason of the urging of fluid cylinder of an assembly 38 said guard 22' will maintain contact with upright P so that the related cutter blade 17' is effecting a trimming in the adjacent zone. The continued travel of vehicle B will effect a continued relative rearward swinging of arm 34 with requisite parting of the same from arm 11 so as to allow upright P to relatively move therebetween (see FIG. 8). Such action will exert a contracting of piston 37, against the fluid pressure so that requisite yieldability of arm 34 is assured. However, by reason of the retraction action of piston 37 a commensurate extending action is accorded piston 26 of fluid assembly 27 thereby causing arm 11 to be swung laterally outwardly about its pivot axis established by pivot pin 12 so that the related guard 22 is moving about upright P for continuing the trimming action by the respective cutter blade 17 while the other cutter blade 17' is operating against an opposed area adjacent upright P.

As the forward travel of vehicle B continues further rearward swinging of outer arm 34 is brought about until the same extends substantially rearwardly (see FIG. 9) but with engagement being maintained with upright P so that the trimming action is completed and with the related piston 37 being caused to become substantially fully retracted. Piston 26 of fluid assembly 27 is commensurately fully extended causing inner arm 11 to be swung into its maximum outer limit of movement. The unique relationship of arms 11,34 assures that trimming is effected around the entire circumference of upright P. Thus, cutter blade 17 associated with inner arm 11 will operate, as it were, against the portion of upright P confronting vehicle B through an arc of substantially 180° and then as indicated in FIG. 8 will also effect cutting through the outer remote quadrant of said upright P. Cooperatively cutter blade 17' will operate against the outer proximate quadrant of upright P and thence also about the portion of said upright P facing tractor B (see FIG. 9) so that no areas adjacent upright P are left unattended.

Manifestly, cutter blade 17, together with its associated guard 22 will lose contact with upright P before blade 17' and its guard 22'. The latter after having cleared upright P will be restored to initial position through fluid acting upon piston 37 and with commensurate retraction of piston 26 by reason of inward swinging of arm 11 under influence of said piston 37; it being recognized that piston 26 is not independently retractable but functions in complementary correspondence to the action of piston 37.

From the drawings it will be observed that guard rail 57 serves to prevent untoward damaging contact between upright P and arm 34 with associated components; said guard rail however does not interfere with the requisite cutting action.

From the foregoing it will thus be seen that arms 34 and 11 are under a differential bias which urges same together but with the bias being sufficiently yieldable so that the arms with their associated blade guards 22,22' may act as cam followers with relationship to the upright to be trimmed which latter acts in the fashion of a cam. Thus, the cutters are in effect urged immediately against the upright P and are so relatively arranged as to jointly circumscribe the same for full trimming action. Once the upright P has been passed and the camming influence is thus lost arms 11 and 34 with their blade guards 22,22' are restored to initial position under influence of the differential bias.

Swing arms 3,3' provide a most important safety function in that the same permit of a swinging of mounting arm 4 with the elements carried thereon in the event pistons 37,26 have reached a limit of mutual yieldability. Thus, if through some misalignment as through inadvertent operator error upright P were to be presented into contact with the hinge connections of arms 11,34 the relative force would cause mounting arm 4 to shift, against the bias of spring 7 so as to prevent damage to the apparatus. Thus the swingable mounting of mounting arm 4 provides an emergency protection in the event the strokes of the pistons of the hydraulic assemblies have reached their respective limits.

From the foregoing it is thus evident that mowing apparatus A is extremely effective for trimming about posts, trees, and the like with such trimming action being automatic. The disposition of such apparatus upon tractor B is set forth for purposes of illustration for it is obvious that the unit may function equally effectively with other types of vehicles.

Figure 10:
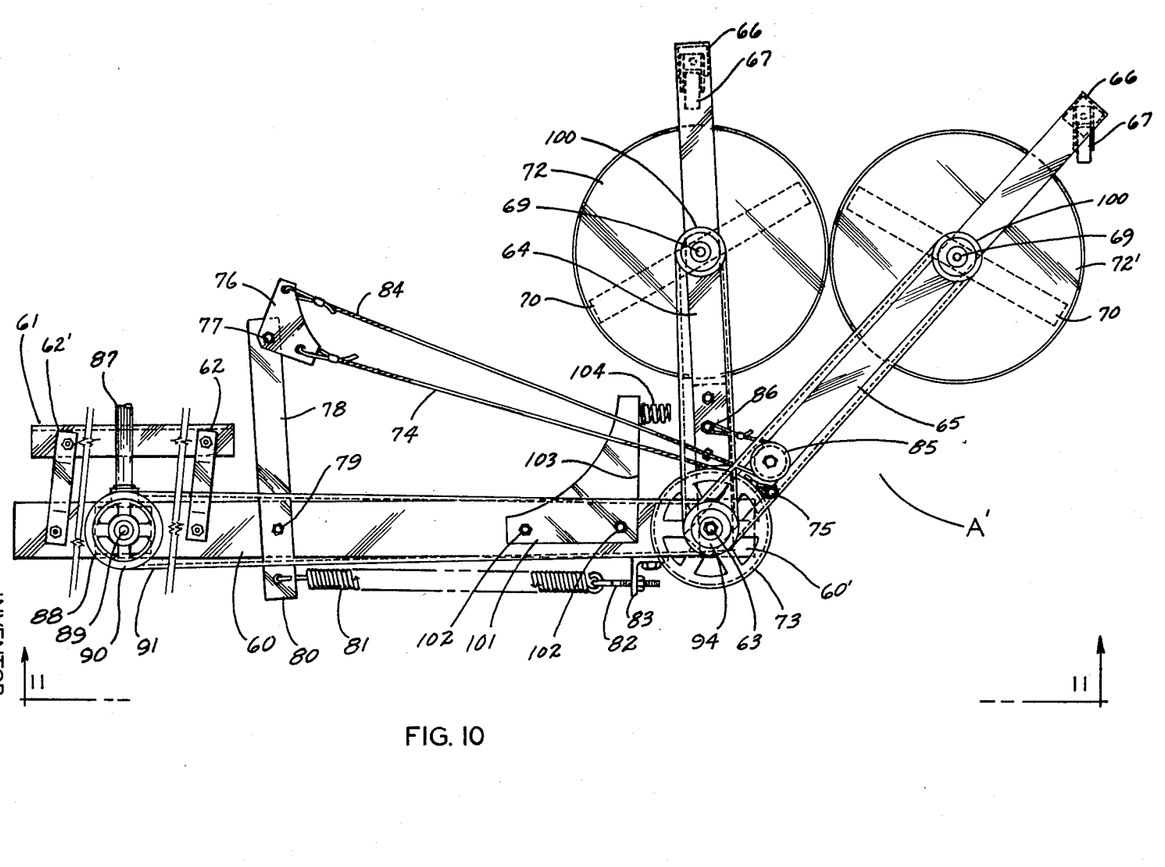
FIG. 10 is a plan view of another form of mowing apparatus constructed in accordance with and embodying the present invention.

Turning now to FIG. 10, A' generally designates a mowing apparatus constructed in accordance with the present invention but differing from apparatus A hereinabove described in subjecting the cooperating arms to a resilient but yieldable force other than as developed through fluid assemblies. Apparatus A' incorporates a mounting arm 60 which is carried upon a beam 61 by means of spaced apart swing arms 62,62' and with said mounting arm 60 having the same relationship to beam 61 as mounting arm 4 with respect to beam 2 described hereinabove in conjunction with Apparatus A. Thus, arm 60 will project at one of its end portions, as at 60', beyond the proximate end of beam 61. In its outer end arm 60 mounts a shaft 63, axially normal to the longitudinal axis of arm 60 and projecting thereabove for purposes presently to be shown. Disposed upon shaft 63 in its lower portion, immediately above arm 60 for swingability thereabove, are the inner ends of inner and outer arms 64,65; said latter overlying the former and both being formed preferably of flat stock. Each of said arms, 64,65 at their outer end extremities, and on their under surfaces, fixedly carry brackets 66 for supporting wheels 67, said latter being freely swingable about their mounting. At points slightly beyond their intermediate zone, each arm 64,65 supports an upstanding hub 68 for journaling therein of a driven shaft 69 which, at their lower ends, downwardly of the related arms 64,65, carry cutter blades 70. Rotatably mounted upon each hub 68 is a collar 71 rigid with related cylindrical cutter guards 72,72' which are in all respects identical with cutter guards 22,22' hereinabove described in conjunction with apparatus A.

Also carried upon shaft 63, immediately above arm 65, is a relatively large diameter sheave 73 being freely rotatable about shaft 63 for guiding a section of a tension cable 74, one end of which is anchored, as by a pin 75, upon the upper face of arm 65 proximate sheave 73 and the other end of which is secured in one corner portion of a triangular bracket 76 which is pivotally mounted in its apex zone, as at 77, upon the forward end portion of a cross arm 78; which latter progresses rearwardly across the upper face of mounting arm 60 and is pivotally engaged thereto, as at 79, for swinging within a a horizontal plane parallel to the plane of arm 60. Cross arm 78 projects a short distance beyond the side edge of mounting arm 60 remote from the connection to bracket 76 and in its extended rear portion, as at 80, is apertured for engaging the hooked end of an extension coil spring 81, the axis of which is substantially parallel to the longitudinal axis of mounting arm 60 and the opposite or outer end of which is connected by an adjustment screw 82 to a bracket 83 rigid upon the rearward face of arm 60 adjacent its outer end. Thus, said spring 81 urges the rearward end of cross arm 80 outwardly, that is, toward the end 60' of arm 60.

The remaining corner of bracket 76 receives one end of a companion tension cable 84 which progresses outwardly toward the outer end of mounting arm 60 and is trained about a pulley 85 carried upon the upper face of arm 65 proximate anchor pin 75; with the other end of said cable 84 being fixed upon a pin 86 mounted on arm 64 (FIG. 10). Thus, by reason of the cables 74,84, cross arm 78, and spring 81, and arms 64,65 are normally urged into such relationship that their respective blade guards 72,72' are in substantially side-by-side contacting condition. In effect, cable 74 will customarily cause a pulling upon arm 65 for directing it toward arm 64, while cable 84 will exert a pushing effect upon arm 64 for influencing same in a direction toward arm 65.

Figures 11, 12:
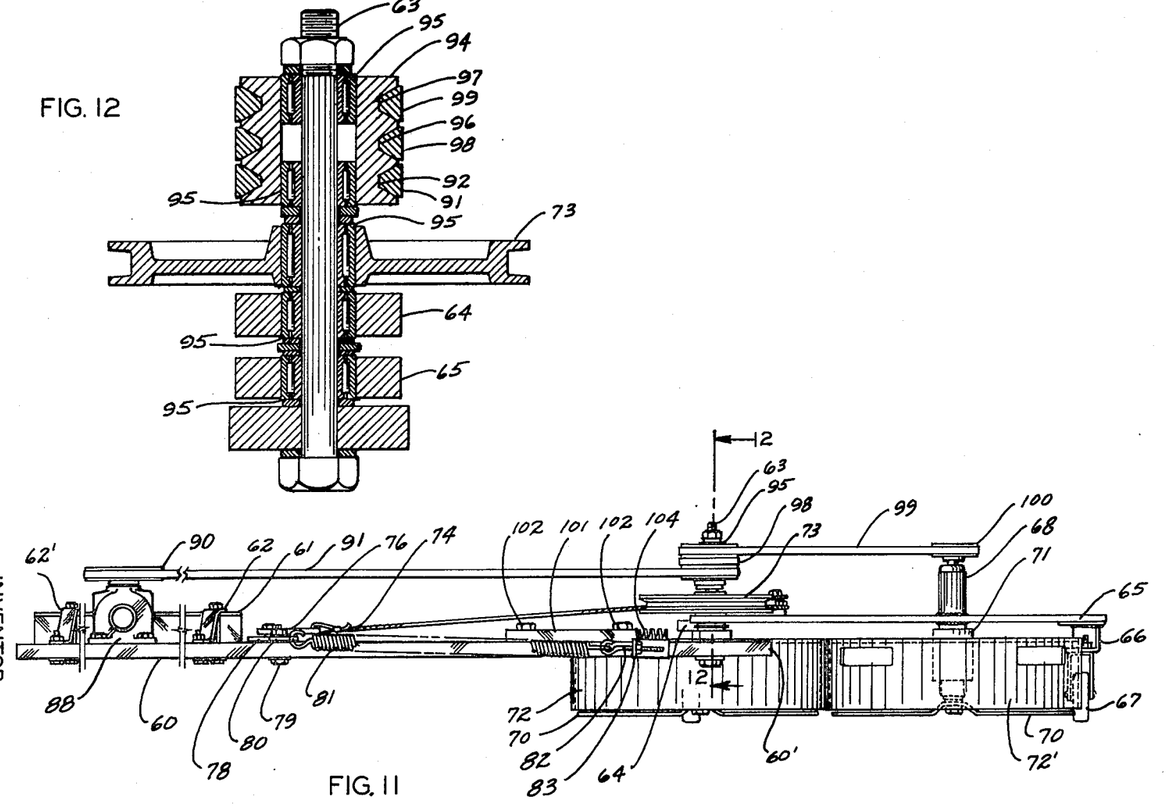
FIG. 11 is an elevational view taken on the line 11—11 of FIG. 10.
FIG. 12 is a vertical transverse sectional view taken on the line 12—12 of FIG. 11.

Shaft 69 may be rotated through various means for assuring of requisite operation of cutter blades 70. For purposes of illustration, the same are rotated by means of a suitable take-off (not shown) from a power source, such as provided by a tractor or the like, and including a shaft 87 engaged within a gear box 88 carried upon arm 60; which box includes an output shaft 89 extending thereabove and mounting a drive wheel 90 about which is trained one end of a flexible transmission belt 91, the opposite end of which extends about the lower groove 92 of a preferably three-groove sheave 94 carried upon the upper end of shaft 63; there being suitable roller bearings 95 for such mounting (FIG. 12). Sheave 94 embodies intermediate and upper grooves 96,97 for receiving the end portions of belts 98,99, respectively, for connecting said sheave 94 with pulleys 100 carried upon the upper ends of each driven shaft 69. Thus, upon suitable energization of the related power source, shafts 69 will be caused to rotate for grass cutting action.

Presented for detent purposes, is a plate 101 mounted as by bolts 102 upon the upper face of arm 60 so as to present a side margin, as at 103, in normal axially parallel relationship to arm 64 and being presented inwardly thereof, that is, toward the left hand side of FIG. 10. Fixed on said inner margin 103 proximate the forward end thereof, and projecting therefrom, is a spring 104 for shock-absorbing engagement with arm 64 in the event of the swinging of the same thereagainst.

Figure 13:
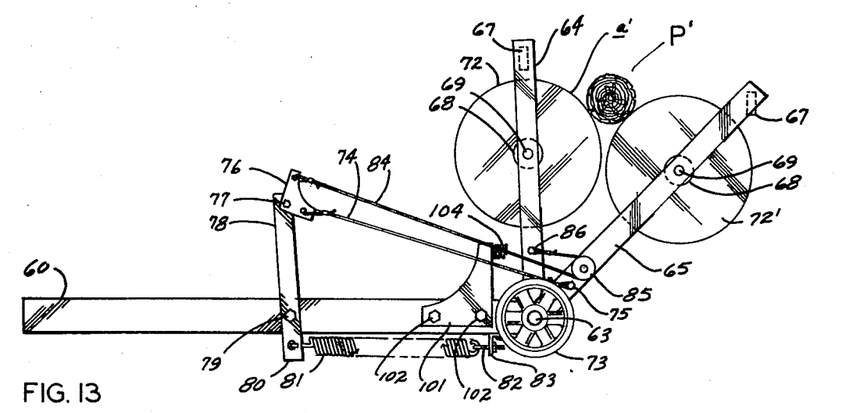
FIGS. 13, 14, and 15 are plan views which illustrate successive positions of the mowing apparatus during trimming action.
Figure 14:
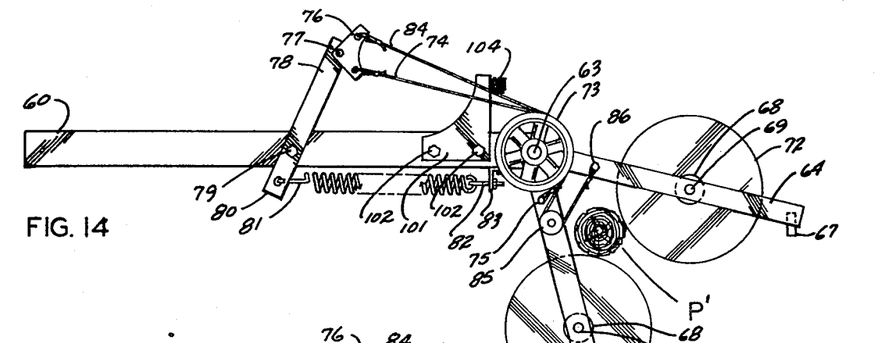
Figure 15:
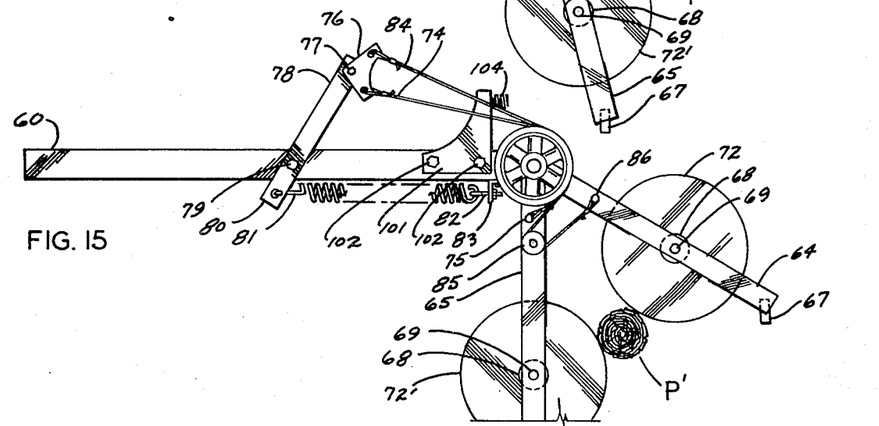

Turning now to FIGS. 13, 14 and 15, the operation of apparatus A' will now be described. It will be observed that arms 64,65 and their related blade guards 72,72' are thus positioned upon travel of the supporting vehicle for trimming about a fence, post, or the like, indicated at P'. Apparatus A' is so presented to upright P' as to cause the latter to be initially contacted on the side face of blade guard 72 in its outer, forward quadrant a'. Just as in the manner discussed hereinabove with respect to mowing apparatus A upright P' will act as a cam with respect to blade guards 72,72' so that the related arm 64,65 will be caused, as cam followers, to be swung so as to present the related blades immediately adjacent upright P' for trimming thereabove. The appropriate forces acting upon arms 64,65 for causing same to maintain contact with upright P' are developed through tension cables 74,84 and spring 81. Thus, as shown in FIGS. 14 and 15, as arm 65 is swung rearwardly, a pulling is effected upon cable 74 with a commensurate stressing of spring 81; said cable 74 following within the groove of sheave 73. Also, by reason of the concurrent pulling of cable 84 about pulley 85, arm 64 is forced to swing in a manner for assuring its blade will cut the related portions about upright P'. As upright P' moves relatively past apparatus A' the said arms will be returned to initial position through relief of the stress upon spring 81.

As above described, in conjunction with mowing apparatus A, the shiftability of mounting arm 60 with respect to beam 61 by reason of swing arm 62,62' provides an emergency safety factor for protecting apparatus A' in the event of undesired relative contact with an obstruction or upright to be trimmed.

With respect to mowing apparati A,A', as above described, it is to be apparent that the same could be mounted beneath a vehicle so that the mounting arm, together with the blade carrying arms, would be presented at a relatively more forward point on the vehicle for the desired usage by the operator. The function of course would be unchanged. Also the provision of wheels 67 on apparatus A' are merely demonstrative of suitable rotational members for closely following the terrain as well as according terminal support to the blade carrying arms.

Figure 16:
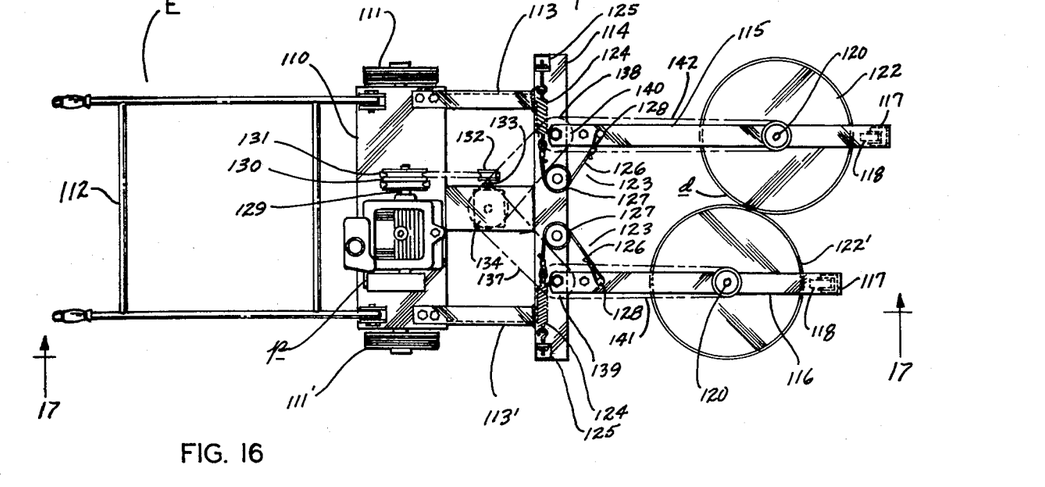
FIG. 16 is a top plan view of a further form of a mowing apparatus constructed in accordance with and embodying the present invention, illustrating same as mounted upon a manually directed vehicle.
Figure 17:
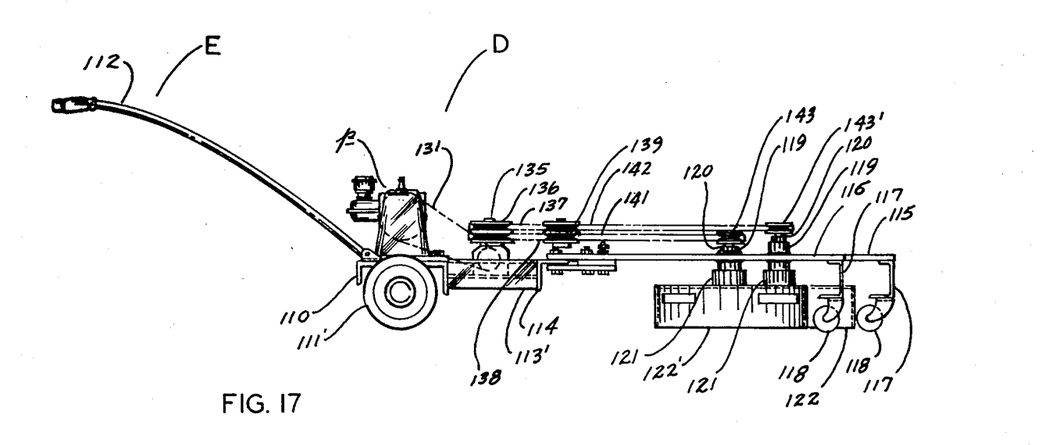
FIG. 17 is a side elevational view of the mowing apparatus illustrated in FIG. 16, as taken along line 17—17 of FIG. 16.

Turning now to FIGS. 16 and 17, D generally indicates a further form of mowing apparatus embodying the present invention and being of the type adapted for disposition upon a manually directed vehicle as indicated at E; said latter incorporating a main frame 110 supported by wheels 111,111' and projecting from the normally rearward end thereof is an arm assembly 112. Projecting forwardly on the opposite sides of main frame 110 are support arms 113,113' which at their forward ends are suitably secured to a transversely extending mounting bar 114 axially normal to the longitudinal axis of vehicle E. Pivoted at their inner ends on mounting bar 114 at points mutually spaced apart but respectively proximate arms 113,113' are arms 115,116 which normally project forwardly of mounting bar 114 in axially parallel relationship. Each of arms 115,116 at their forward end carries a bracket 117 for mounting a wheel 118. Each arm 115,116 rearwardly of their related wheel brackets 117 supports an upstanding hub 119 for journaling therein of a driven shaft 120 which at their lower ends, below the respective arms 115,116, carry cutter blades (not shown). Rotatably mounted upon each hub 119 is a collar 121 rigid with related cylindrical cutter guards 122, 122', which together with the described related structure are in all respects identical with the corresponding elements set forth in conjunction with apparatus A hereinabove.

The swingability of each arm 115,116 is controlled by a spring and cable assembly as indicated generally at 123 wherein an extension coil spring 124 is adjustably connected to a bracket 125 fixed on mounting bar 114 at the proximate end, and on the upper face, thereof. The opposite end of spring 124 is engaged to a cable 126 which extends in a direction toward the centerline of vehicle E but immediately short thereof and inwardly of the arm, is directed about a sheave 127 rotatably mounted upon bar 114 for guiding said cable outwardly toward the associated arm for securement of its end upon a pin 128 fixed on such arm. Thus, by reason of the bias of springs 124, arms 115, 116 will be urged toward each other so that cutter guards 122, 122' will normally be in mutual contact (as shown in FIG.16).

The hub 119 on arm 116 is located slightly rearwardly of the related hub of arm 115 so as to present the respective cutter guard 112' commensurately rearwardly of cutter guard 122 whereby the normal line contact between said guards 122,122' will be in a rearward inner quadrant of cutter guard 122 as at d. In view of this relationship arm 116 may be shorter than arm 115.

In order to effect rotation of driven shafts 120 for blade operation power may be supplied from a prime mover p carried on main frame 110 for operating wheels 111,111' of said vehicle E. Thus, a takeoff 129 for said prime mover p mounts a pulley 130 about which is trained the normally rearward end of a drive belt 131, said latter extending forwardly for disposition about a driven pulley 132, fixed on the end of a shaft 133 of a gear box 134. Extending upwardly from gear box 134 is a drive shaft 135 which mounts a two-groove sheave 136 for accommodating flexible belts 137,138 which at their opposite ends are respectively trained about pulleys 139,140 fixed upon the upper ends of hinge pins (not shown) by which arms 115,116 are connected to mounting bar 114. Pulleys 139, 140 are in turn operatively engaged to respective driven shafts 120 by means of motion transmitting belts 141,142 suitably trained at their opposite ends about pulleys 143,143' carried on the upper end of each driven shaft 120.

It will thus be seen that mowing apparatus D will operate in the same manner as apparati A,A' above described with the distinction that vehicle E is adapted for manual direction, although the same may be powered for travel. Thus, the present invention is useful with the type of mowing equipment handled by the average home owner and will assure of appropriate trimming about trees, light post, and the like. Vehicle E is illustrated as merely exemplary of a hand guided unit since it is quite apparent that apparatus D could be easily mounted upon like units of varying construction. In usage the operator will direct mowing apparatus D toward the particular upright to be trimmed (not shown) causing same to move relatively between said guards 122,122'and therepast toward mounting bar 114. The user will then necessarily have to pull vehicle E rearwardly for withdrawing the particular upright, as it were, from the space adjacent bar 114. However, it is to be understood that the trimming action entirely about the circumference of the particular upright is achieved during the forward movement; with the rearward movement being solely for disengaging purposes.

Having thus described my invention, what I desire and claim to obtain Letters Patent for is:

1. A mowing apparatus comprising means mountable upon a vehicle, first and second arms swingably disposed at their normally rearward ends upon said mounting means, rotary blades provided at the outer end of each of said arms, means supporting said blades upon each of said arms for rotation about an axis normal to the longitudinal axis of the related arm, means for effecting rotation of said blades, a guard carried upon each arm surroundingly of the related blades, a first fluid assembly operatively engaged to said first arm, a second fluid assembly engaged to said second arm, a source of fluid connected to said first and second fluid assemblies, said second fluid assembly being of relatively greater capacity than said first fluid assembly for urging said second arm toward said first arm.

2. A mowing apparatus as defined in claim 1 and further characterized by said mounting means comprising a boom member, means swingably mounting said boom member upon said vehicle for rendering said boom member axially shiftable and yieldable means for urging said boom member into normal operative position but allowing same to yield under applied stress.

3. A mowing apparatus as defined in claim 1 and further characterized by said means mountable upon said vehicle being a boom, said first and second arm being swingably disposed in one end portion of said boom, said second arm being located laterally outwardly of said first arm, said first fluid assembly comprising a cylinder, means pivotally mounting one end of said first fluid assembly cylinder upon said boom, a piston provided within said last mentioned cylinder and having its normally outer end pivotally engaged to said first arm proximate its engagement to said boom, said second fluid assembly having a cylinder, means supporting said second fluid assembly cylinder from said boom on the opposite side thereof than said first fluid assembly, said second fluid assembly cylinder having a piston, means engaging the outer end of said last mentioned piston to said second arm, the stroke of said piston of said second fluid assembly being longer than the stroke of said piston of said first fluid assembly.

4. A mowing apparatus as defined in claim 3 and further characterized by said boom being swingably mounted, and yieldable means urging said boom for presenting said first and second arms laterally outwardly of said vehicle and yet permitting of yielding of said boom together with said arms under applied stress.

5. A mowing apparatus comprising means mountable upon a vehicle, first and second arms swingably disposed at their normally rearward ends upon said mounting means, rotary blades provided at the outer end of each of said arms, means supporting said blades upon each of said arms for rotation about an axis normal to the longitudinal axis of the related arm, means for effecting rotation of said blades, a spring member having outer and inner ends, said outer end of said spring member being anchored to said mounting means, and movable means connected to the inner end of said spring member and engaged to said first and second arms, said movable means comprising a first cable secured at one end to said first arm, a second cable secured at one end to said second arm, and pivotally mounted means interconnecting said spring member and said first and second cables.

6. A mowing apparatus as defined in claim 5 and further characterized by said movable means comprising a link pivotally engaged upon said mountable means, and having a normally rearward and normally forward end, said spring inner end being engaged to said link rearward end, a bracket pivotally mounted on the forward end of said link, a first cable connecting said bracket and said second arm, a second cable connecting said bracket and said first arm, and directing means provided on said second arm for training thereabout of said second cable.

7. A mowing apparatus comprising means mountable upon a vehicle, first and second arms swingably disposed at their normally rearward ends upon said mounting means, rotary blades provided at the outer end of each of said arms, means supporting said blades upon each of said arms for rotation about an axis normal to the longitudinal axis of the related arm, means for effecting rotation of said blades, a guard carried upon each arm surroundingly of the related blades, said arms being disposed in mutually spaced relationship upon said mounting means, first and second springs fixed at one of their ends upon said mounting means, respectively, proximate said first and second arms and cables interconnecting the other ends of said first and second springs with said first and second arms, respectively.

8. A mowing apparatus as defined in claim 7 and further characterized by said mounting means comprising a boom member disposed at the forward end of said vehicle and having its axis perpendicular to the longitudinal axis of said vehicle, said first and second arms projecting forwardly of said mounting arm with the axes thereof normally parallel.

* * * * *